US005563215A

United States Patent [19]

Bryhan et al.

[11] Patent Number: 5,563,215
[45] Date of Patent: * Oct. 8, 1996

[54] METHOD OF ATTACHING DIALDEHYDE STARCH TO A SURFACE AND PRODUCTS PRODUCED BY THAT METHOD

[75] Inventors: Marie D. Bryhan, Lindley; Leroy S. Hersh, Painted Post; Frances M. Smith, Elmira, all of N.Y.

[73] Assignee: Corning Incorporated, Corning, N.Y.

[*] Notice: The term of this patent shall not extend beyond the expiration date of Pat. No. 5,281,660.

[21] Appl. No.: 184,666

[22] Filed: Jan. 21, 1994

Related U.S. Application Data

[63] Continuation-in-part of Ser. No. 972,327, Nov. 5, 1993, Pat. No. 5,281,660.

[51] Int. Cl.$^6$ ...................................................... C12N 11/00
[52] U.S. Cl. ........................ 525/54.1; 525/54.24; 435/174
[58] Field of Search ............................ 427/430.1, 443.2; 536/104, 105; 428/543; 435/174; 525/54.1, 54.24

[56] References Cited

U.S. PATENT DOCUMENTS

| | | |
|---|---|---|
| 3,284,204 | 11/1966 | von Lillin . |
| 3,495,000 | 2/1970 | Merabi et al. . |
| 3,706,633 | 12/1972 | Katchalski . |
| 3,983,299 | 9/1976 | Regnier . |
| 4,361,635 | 11/1982 | Kinderman . |
| 4,876,126 | 10/1989 | Takemura et al. . |
| 5,266,328 | 11/1993 | Skubitz et al. ........................ 424/427 |
| 5,306,620 | 4/1994 | Ginsberg et al. ........................ 436/63 |
| 5,308,641 | 5/1994 | Cahalan et al. ........................ 427/2 |
| 5,415,938 | 5/1995 | Cahalan et al. ........................ 428/409 |

FOREIGN PATENT DOCUMENTS

WO89/07618  8/1989  WIPO .

OTHER PUBLICATIONS

Ikada et al. "Grafting of Proteins onto Polymer Surfaces with the Use of Oxidized Starch", *Journal of Biomedical Materials Research*, vol. 13, Issue No. 4, Jul. 1979, pp. 607–622.

*Primary Examiner*—Jeffrey C. Mullis
*Attorney, Agent, or Firm*—A. L. Michaelsen

[57] ABSTRACT

A method of attaching dialdehyde starch to surfaces is disclosed. A substrate to which substances may be coupled, which substrate comprises at least one surface coated with dialdehyde starch, and products produced utilizing the substrate are also provided.

2 Claims, 13 Drawing Sheets

METHOD OF ATTACHING DIALDEHYDE STARCH TO A SURFACE AND PRODUCTS PRODUCED BY THAT METHOD

This is a continuation-in-part of Ser. No. 07/972,327, filed Nov. 5, 1992, now U.S. Pat. No. 5,281,660.

1. Field of the Invention

This invention relates to methods of attaching dialdehyde starch to a surface and to products produced by those methods.

2. Background of the Invention

Cell culture products are used to grow large numbers of desired cells for medical testing, research and other uses. Certain materials, typically polymers, are optimal for use as substrates in cell culture products and are typically employed. For example, polystyrene is cheap, optically clear, and may be processed at low temperatures. Large molecular weight cell attachment proteins (CAP's) are bound to substrate surfaces. Cells are then grown on the CAP-coated surfaces. The cells adhere to the CAP's, and the CAP's promote cell growth. The CAP's bind readily to substrate materials such as polystyrene. However, CAP's are very expensive and have short shelf lives, even at subfreezing temperatures.

In the last few years, it has been shown that certain regions of these CAP's—small peptides—can mimic the cell adhesion and growth promoting action of the CAP's. The primary advantage of these peptides is their greater stability—they can be stored at room temperatures for long periods of time. However, unlike the CAP's, the unmodified peptides do not adhere well to substrate materials such as polystyrene. In order to obtain sufficient surface concentration of these cell attachment peptides (cap's) on substrate materials, the material's surface must be chemically modified. Most materials used as substrates for cell culture products are relatively stable and difficult to chemically modify. Typical methods of chemical modification include strong acids and toxic solvents or plasma or corona discharge treatments. Once the material is modified to accept cap's, it is said to be "activated".

Dialdehyde starch (DAS) is a commercially available compound made from starch by oxidation with periodic acid. DAS has been used in medicinal and bio-active compositions. U.S. Pat. No. 3,495,000 discloses sustained release medicinal compositions adapted for peroral administration using a matrix comprising an admixture of dialdehyde starch and polyvinylpyrrolidone, polyvinyl chloride or ethyl cellulose. The medicament, dialdehyde starch, and polymer are mixed and granulated.

At an oxidation degree of 100%, DAS contains two aldehyde groups per original glucose unit. These aldehyde groups readily react with molecules containing amine, imine, or hydrazide groups. U.S. Pat. No. 3,706,633 discloses water-insoluble, enzymatically active compositions prepared by condensing dialdehyde starch with an alkylene diamine to produce a polymeric product, reducing and diazotizing the product, so as to produce a polymeric polydiazonium salt, and then coupling the product with an active enzyme.

DAS has also been utilized in photographic mixtures. U.S. Pat. No. 3,284,204 discloses an adhesive solution for bonding the hydrophobic film base and the hydrophilic emulsion in photographic film. The adhesive solution comprises gelatin, an alkylene glycol derivative of polymannuronic acid, dialdehyde starch, water and a water-miscible solvent or mixture of solvents.

An approach to activating surfaces of certain cell culture substrate materials which uses DAS and which is an alternative to chemical modification of a substrate is disclosed in Y. Ikada, H. Iwata, T. Mita, and S. Nagaoka, "Grafting of Proteins onto Polymer Surfaces with Use of oxidized Starch", J. Biomed Mater. Res., 13, 607-22 (1979). In that approach, DAS was grafted to PVA hydrogel and EVA film. The PVA and EVA contain hydroxyl groups. The DAS molecules were grafted onto the polymers through acetalization between the aldehyde and the hydroxyl groups. Biologically active molecules were then attached to the bound DAS. Alpha-amylase grafted onto the DAS-coated EVA film showed a distinct enzymatic activity in hydrolysis of amylose and starch, but the activity was very low compared with that of ungrafted, soluble alpha-amylase.

Although the method of Ikada et al allows specific cell culture substrate materials to be activated so as to accept cap's without chemical modification of the substrate materials, the method is taught only for polymers containing hydroxyl groups—which will chemically react with DAS. These polymers, such as EVA and PVA, are not optimal for cell culture substrate materials from a cost and processing standpoint. Furthermore, optimal activated substrate surfaces bind biologically active molecules without significantly hampering their activity. Therefore, a need exists for a method of attaching DAS to other surfaces, notably polystyrene, without chemical modification of the surfaces and without significantly deleteriously affecting the biological activity of biologically active molecules which may be attached.

SUMMARY OF THE INVENTION

The present invention satisfies the above described need. The present invention provides a method of attaching dialdehyde starch to a surface, the method comprising: placing an aqueous solution of dialdehyde starch on the surface for a period of time sufficient for at least a portion of the dialdehyde starch to be adsorbed by the surface; removing the solution; and drying the surface at a temperature of from about 50° C. to about 150° C.

The present invention also provides a substrate to which substances may be coupled, the substrate comprising at least one dialdehyde starch coated surface produced by the method of the present invention. More specifically, the present invention provides a substrate to which substances may be coupled, the substrate comprising at least one surface onto which molecules of dialdehyde starch are adsorbed.

The present invention also provides products produced by coupling specific substances to the substrate of the present invention. Biologically active molecules may be coupled to the substrate of the present invention without significantly deleteriously affecting their biological activity. These biologically active molecules include, for example, cell attachment proteins (CAP's), cell attachment peptides (cap's), and other aminated biomolecules. Coupling these molecules to the DAS-coated surfaces of the substrate of the present invention produces novel cell culture products.

It will be appreciated that the products encompassed by the present invention are not limited to cell culture products, but encompasses any product produced by binding a substance or substances to the substrate of the present invention. For example, the present invention provides a support for photographic film produced by coupling a gelatin film to the DAS-coated surfaces of a substrate of the present invention.

The method and products of the present invention can utilize a wide variety of polymers which are especially useful as cell culture substrate materials, including polystyrene, polypropylene, polyethylene terephthalate, polyallomer, cellulose acetate, and polymethylpentene. Furthermore, the method and products of the present invention can utilize aminosilane coated glass. The method and products of the present invention are not limited to utilizing surface materials containing hydroxyl groups or other chemical groups which will chemically react with DAS.

It is an object of the present invention to provide a simple, easy-to-use method of attaching DAS to a surface.

It is an object of the present invention to provide a method of attaching DAS to a surface which method is not limited to surface materials containing hydroxyl groups.

It is an object of the present invention to provide a method of attaching DAS to a surface which method is not limited to surface materials containing chemical groups which will chemically react with DAS.

It is an object of the present invention to provide a method of attaching DAS to a surface which method may be applied to a variety of surface materials, including polystyrene, polypropylene, polyethylene terephthalate, polyallomer, cellulose acetate, and polymethylpentene.

It is an object of the present invention to provide a method of attaching DAS to a surface which method may be applied to aminosilane-coated glass.

It is an object of the present invention to provide a method of attaching DAS to a surface which method does not significantly deleteriously affect the activity of biologically active molecules which may be attached.

It is an object of the present invention to provide a substrate to which substances may be coupled, which substrate comprises at least one DAS-coated surface and which surface is not limited to materials containing hydroxyl groups.

It is an object of the present invention to provide a substrate to which substances may be coupled, which substrate comprises at least one DAS-coated surface and which surface is not limited to materials containing chemical groups which will chemically react with DAS.

It is an object of the present invention to provide a substrate to which substances may be coupled, which substrate comprises at least one DAS-coated surface and which surface may be selected from a variety of materials, including polystyrene, polypropylene, polyethylene terephthalate, polyallomer, cellulose acetate, and polymethylpentene.

It is an object of the present invention to provide a substrate to which substances may be coupled, which substrate comprises at least one DAS-coated surface and which surface may be aminosilane-coated glass.

It is an object of the present invention to provide novel cell culture products produced by coupling biologically active molecules to a DAS-coated surface of a substrate of the present invention.

BRIEF DESCRIPTION OF THE FIGURES

FIGS. 8a, 8b and 8c are graphs of the growth time in fractions of days vs. the number of specific cells counted on the surface. FIG. 8a shows the results for rat aortic smooth muscle cells; FIG. 8b shows the results for human tongue cells; and FIG. 8c shows the results for human endothelial cells. Data for three surfaces is shown: a standard air-plasma or corona discharge treated polystyrene surface (Control), a polystyrene surface coated with DAS using a 0.10 mg/ml solution and treated with a 1 mM Girard's reagent after binding the cell attachment peptide Gly-Arg-Gly-Asp-Ser-Pro-Lys (0.1DAS/100R/G), and a polystyrene surface coated with DAS using a 0.10 mg/ml solution and treated with 4-hydrazinobenzene sulfonic acid after binding the cell attachment peptide Gly-Arg-Gly-Asp-Ser-Pro-Lys (0.1DAS/100R/H).

DESCRIPTION OF THE PREFERRED EMBODIMENTS

In one embodiment of the method of the present invention, an aqueous solution of DAS is produced by first making a paste. The paste is made by adding a small amount of water to a weighed out portion of DAS. The DAS paste is added to a suitable flask containing water for refluxing for a period of time sufficient to completely disperse the oxidized starch granules. The clear DAS solution is then rapidly cooled to room temperature.

A certain volume of the DAS solution is then placed on the surface to be activated and allowed to stand for a period of time sufficient to allow the surface to adsorb at least a portion of DAS. The DAS solution is then decanted from the vessel, and the ware is dried at about 65° C. to about 70° C. for a suitable period of time.

The DAS-coated surface produced by the method of the present invention may be coupled to a biologically-active molecule, such as a peptide or protein, by a variety of methods for surface attachment well known to those skilled-in-the-art. One such method comprises placing a solution containing a reducing agent, a biologically active molecule and a suitable buffer at a pH of about 7 on the surface; gently shaking the solution-covered surface at a temperature of from about 20° C. to about 25° C. for at least 2 hours; removing the solution; and drying the surface at a temperature of from about 35° C. to about 40° C. for about 30 minutes.

Another method comprises placing a solution containing biologically active molecules and a suitable buffer at a pH of about 8 on the dialdehyde starch coated surface; gently shaking the solution-covered surface at a temperature of from about 20° C. to about 25° C. for at least 2 hours; removing the solution; and drying the surface at a temperature of from about 35° C. to about 40° C.

The dissolution of DAS is a complex process involving dispersion, primary bond scission, and intramolecular reactions. Any method may be performed which provides an aqueous solution of DAS, including methods utilizing steam or microwaves. However, the above cited method utilizing refluxing is preferred. The amount of DAS and water used may vary depending on the concentration of DAS desired. A DAS solution of 0.10 mg/ml of water (volume of 500 ml) requires about 30 minutes of boil time for an appearance of a clear solution.

The present invention is based on the discovery that DAS will strongly attach to various polymers and produce a reactive surface. In order for the DAS to be firmly attached, a two step process is required. First, the water dispersible DAS is physically adsorbed to the polymer surface. Then, after completely removing the DAS solution, the article is dried at moderate temperatures. A minimum amount of drying is necessary to produce an activated surface that is stable in an acid or neutral aqueous environment. DAS coated surfaces will degrade at pH values above 8.5.

Unlike the grafting of DAS to PVA or EVA as taught by Ikada et al, which involves chemical bonding, the bonding of DAS to a cell growth surface as taught in the present invention occurs via physical bonds, possibly through a combination of hydrophobic and acid/base interactions. That is to say, the method of Ikada et al provides a hydroxyl containing surface to which DAS is chemically bound; the present invention provides a surface onto which molecules of DAS are adsorbed. The present invention is applicable to a wide variety of surface materials, including polystyrene, polypropylene, polyethylene terephthalate, polyallomer, cellulose acetate, and polymethylpentene. Two surface materials, polyvinylchloride and polytetrafluoroethylene, were found not to adsorb DAS when treated with the present method. It is believed that the surface has to have a proper overall polarity to adsorb and hold the DAS.

A key aspect of the present invention is that DAS becomes nearly irreversibly attached to some polymers after the moderate heating step. When a nonwetting surface such as polystyrene is exposed to DAS solution, the surface becomes wetting in seconds as DAS attaches. However, at that point, DAS is easily rinsed off and the surface becomes nonwetting again unless the heating step is applied. The surface is preferably dried at a temperature of from about 65° C. to about 75° C.

It is preferred that the DAS used for the present invention have a high degree of oxidation. Experiments performed by the inventors utilized DAS obtained from SIGMA (P9265) with a reported level of oxidation of 73% and containing 10% water.

Determination of the surface concentration of reactive aldehyde groups on DAS-coated surfaces was accomplished by using a modified version of a colorimetric method used for DAS solutions. A chromophore, 2,4-dinitrophenylhydrazine (DNPH) (SIGMA D-2630) was dissolved in 1M HCl at a concentration of 0.25 mg/ml (0.9 mM) and then reacted with the DAS coated surface for 30 minutes in the dark. The DNPH solution was then decanted, the surface washed with distilled water for 15 minutes and then dried in air. The DNPH-DAS complex was solubilized by contact with 0.1M NaOH for 5–10 minutes at room temperature in the dark. The pH was decreased to 2 after the NaOH soak and the absorbance was read at 360 nm.

Figure 2:
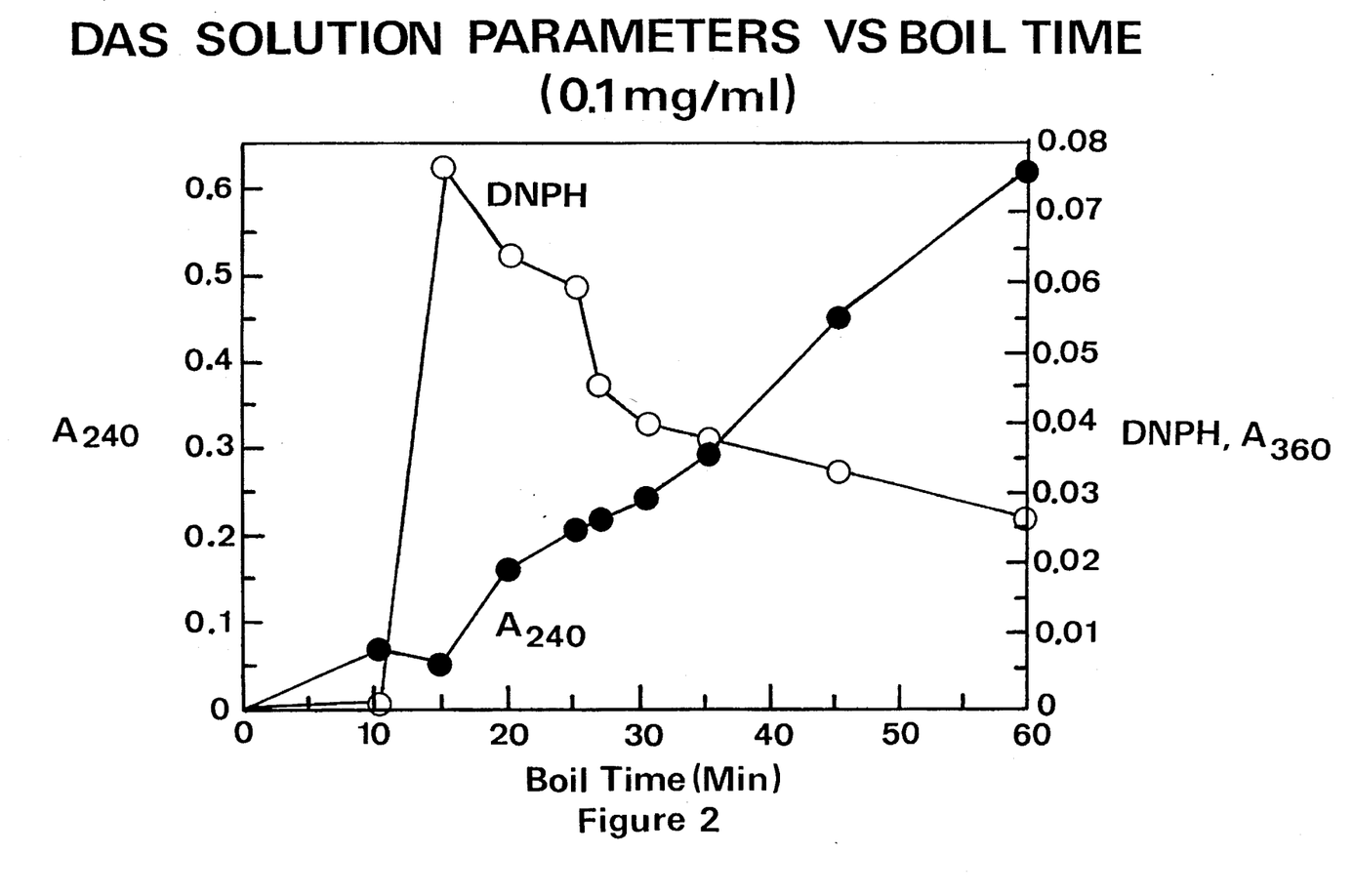
FIG. 2 is a graph of the boil time of the refluxing DAS solution vs. the absorbance at 240 nanometers of the solution. The graph also shows boil time vs. absorbance at 360 nm measured using the DNPH assay described herein on the coated surface.

The coating properties of the refluxed DAS solution change with time of reflux as shown in FIG. 2. FIG. 2 plots the DNPH absorbance values at 360 nm for DAS-coated surface vs. boil time of the DAS solution used to coat the surface. After clarity, the number of binding sites decrease with time, but at a much reduced rate of change. In order to obtain good reproducibility of binding sites of DAS coated polystyrene, the DAS solution boil is ended 5 minutes after clarity is obtained.

Figure 3:
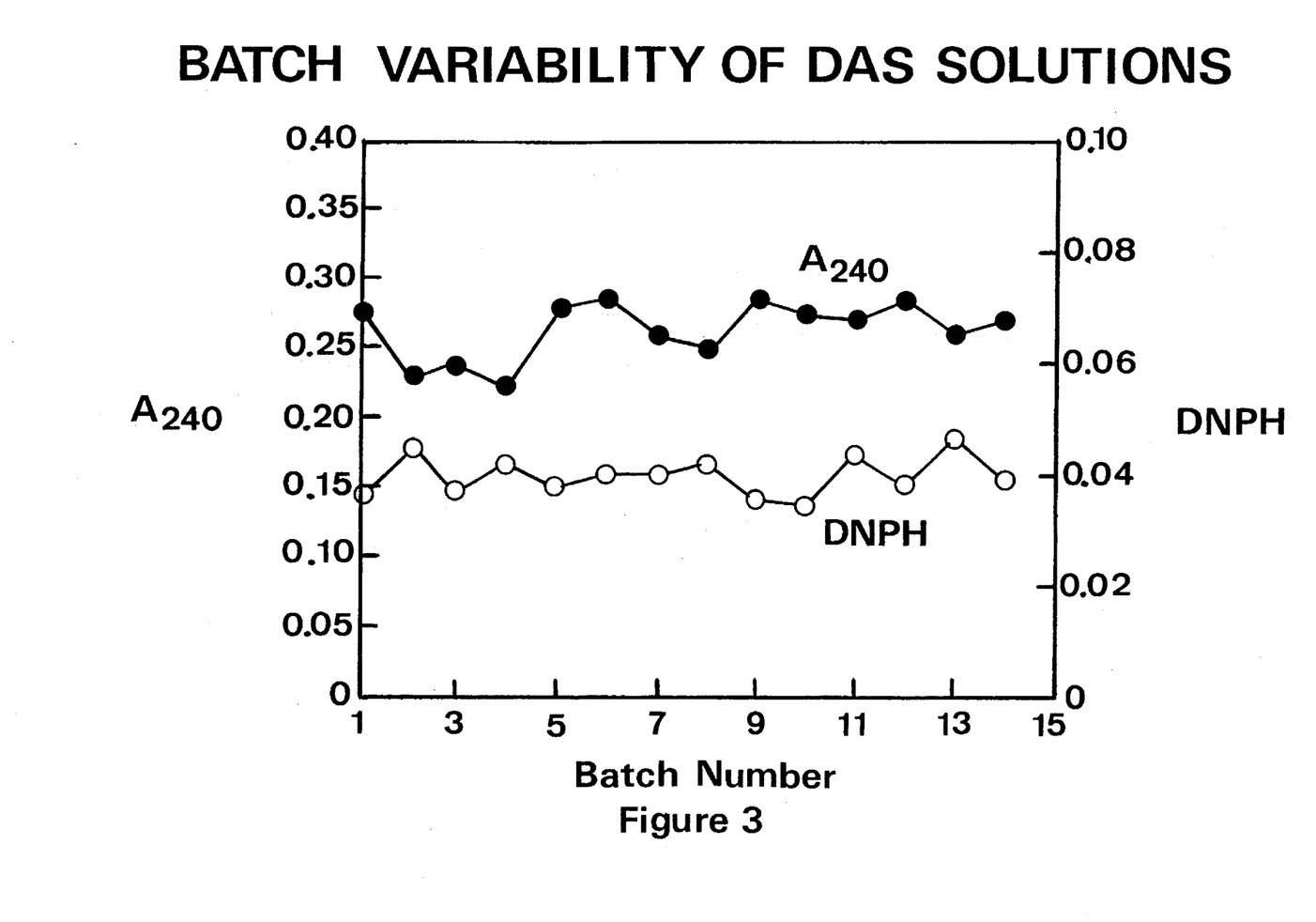
FIG. 3 is a graph of different batches of DAS solution boiled at a constant time vs. the absorbance at 240 nm of the solution. The graph also shows the batches vs. absorbance at 360 nm measured using the DNPH assay described herein on the coated surface.

The low variability of the DNPH absorbance values at 360 nm for different batches of DAS coated polystyrene which were coated with DAS solutions boiled at a constant time is displayed in FIG. 3. The A240 values (absorbance at 240 nm) of the DAS solution also showed good reproducibility even with the steady increase of A240 with boil time as shown in FIG. 2.

Figure 4:
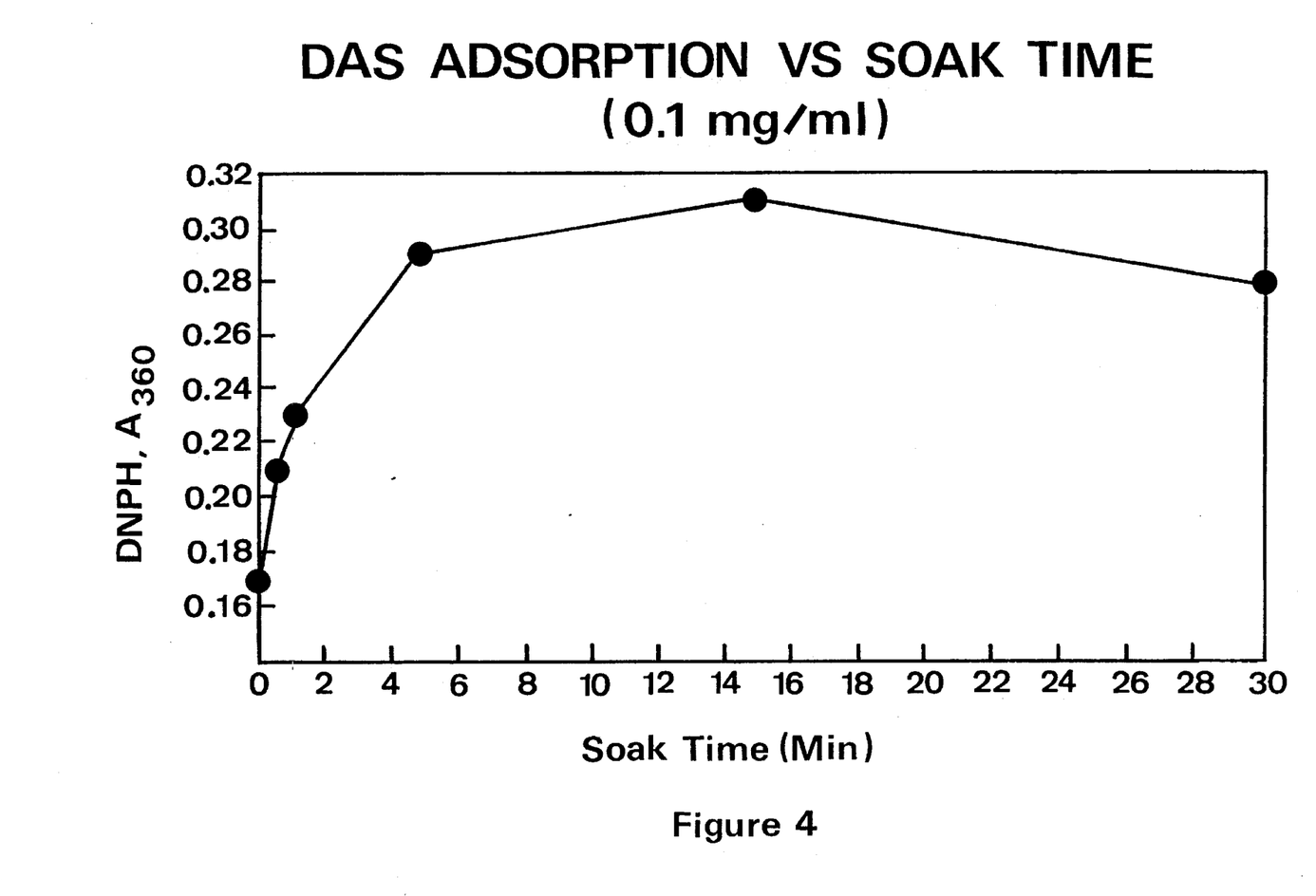
FIG. 4 is a graph of the time a polystyrene surface was soaked with 0.10 mg/ml DAS solution vs. the DNPH assay absorbance for the surface at 360 nm.

The higher the DAS concentration, the faster the maximum amount of DAS adsorbed by the surface. The rate of adsorption of DAS to polystyrene was determined by the DNPH assay of attached DAS. The results for an 0.10 mg/ml DAS solution are shown in FIG. 4. A minimum of about 5 minutes adsorption time is required for an equilibrium DNPH value. The minimum adsorption time increases to about 15 minutes for a concentration of 0.05 mg/ml DAS. The minimum adsorption time to reach an equilibrium DNPH value may vary depending on the surface used.

Figure 5:
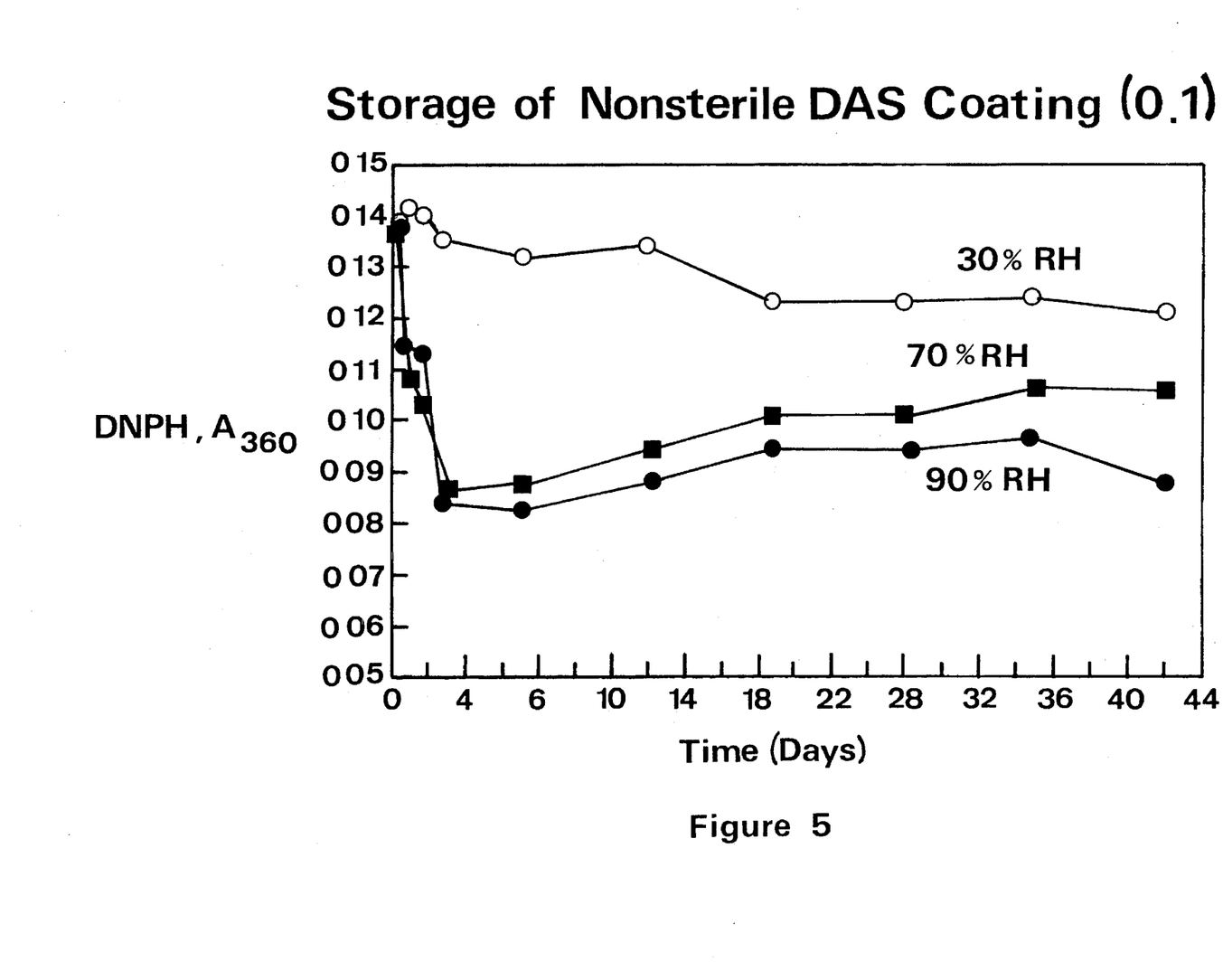
FIG. 5 is a graph of the storage time in days at 30%, 70% and 90% relative humidity (RH) of a nonsterile DAS-coated polystyrene substrate produced with DAS using an 0.10 mg/ml DAS solution vs. the DNPH assay absorbance for the surface at 360 nm.
Figure 6:
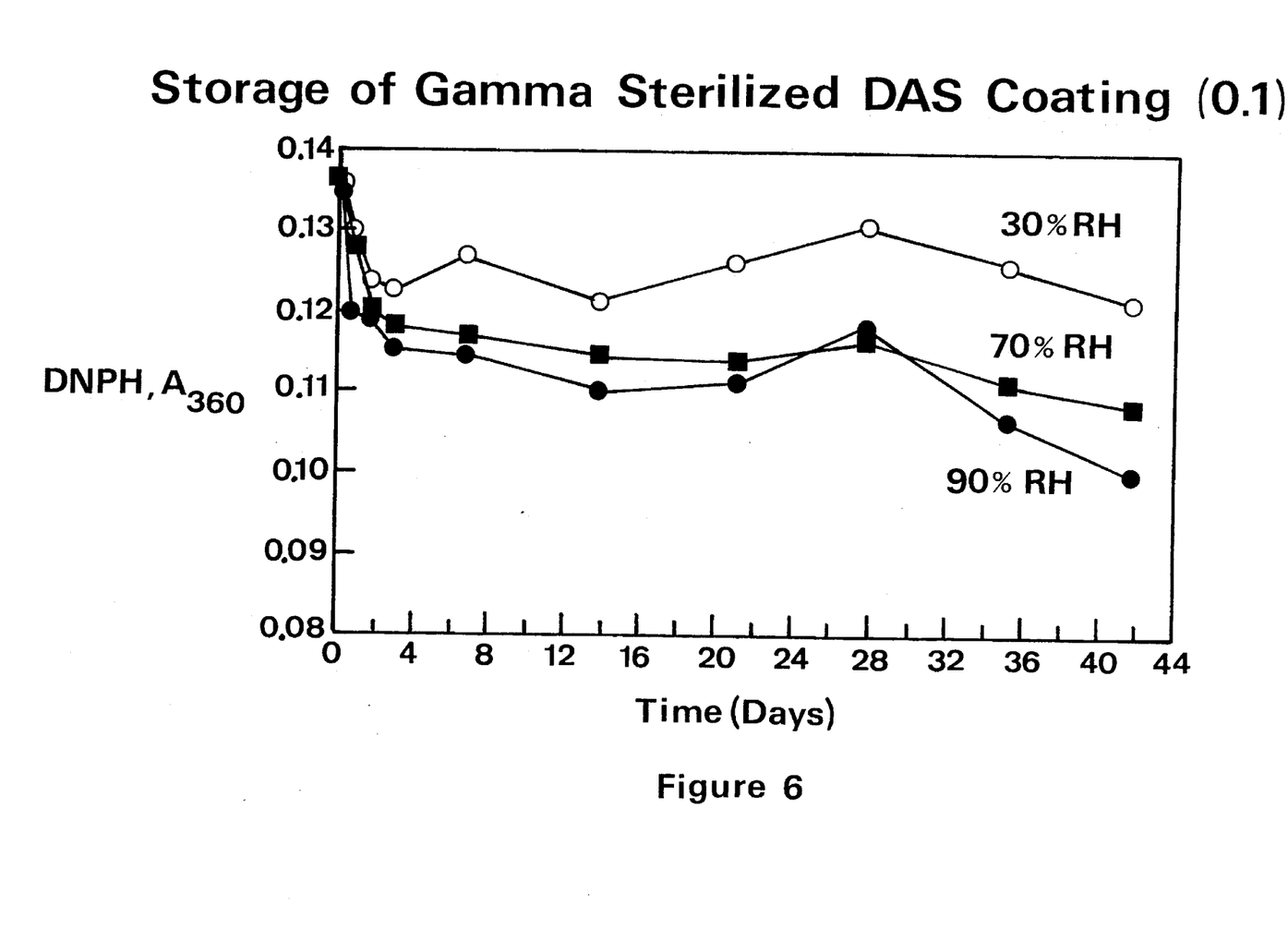
FIG. 6 is a graph of the storage time in days at 30%, 70% and 90% relative humidity (RH) of a gamma radiation sterilized DAS-coated polystyrene substrate produced with DAS using an 0.10 mg/ml DAS solution vs. the DNPH assay absorbance for the surface at 360 nm.

After DAS is dispersed in water, the useful lifetime of the solution kept at ambient, but sterile conditions is about one month. The storage stability of both sterile and nonsterile DAS coated polystyrene plates was determined at 30%, 70%, and 90% relative humidity at 25° C. The results plotted in FIGS. 5 and 6 indicate that there is about a 10% loss of binding sites (BS) at 30% relative humidity, with much higher losses at higher relative humidity values after one month storage.

Although optimal cell culture substrate materials for typical use are polymers such as polystyrene, for certain uses a more solvent-resistant substrate is required. Glass has properties which would make it an ideal growth surface material when solvent-resistance is required. However, DAS does not significantly adsorb onto glass surfaces. The present invention provides a method for activating the surface of aminosilane-coated glass. The aminosilane-coated glass may be produced by known methods. A preferred method comprises treating the glass in oxygen plasma at about 1 Torr for about 30 seconds, and then soaking the glass in a 10% 3-aminopropyltriethoxysilane and water solution at between about 60° C. and 80° C. for about 3 hours. The glass is then rinsed in water and cured for about 18 to 24 hours at between about 50° C. and 120° C. The DAS is applied to the aminosilane-coated glass just as DAS is applied to polymer surfaces, using the method of the present invention. Table 1 compares DAS-coated to polystyrene, DAS-coated glass, and DAS-coated on aminosilane-coated glass. The amount of DAS attached is measured by absorption at 360 nm using the DNPH assay. The Table shows that a much greater amount of DAS is adsorbed by the aminosilane-coated glass than the untreated glass.

| Surface | DNPH Assay Value (OD360 nm) |
|---|---|
| polystyrene/DAS | 0.050 |
| glass/DAS | 0.009 |
| glass/aminosilane/DAS | 0.080 |

Figure 7:
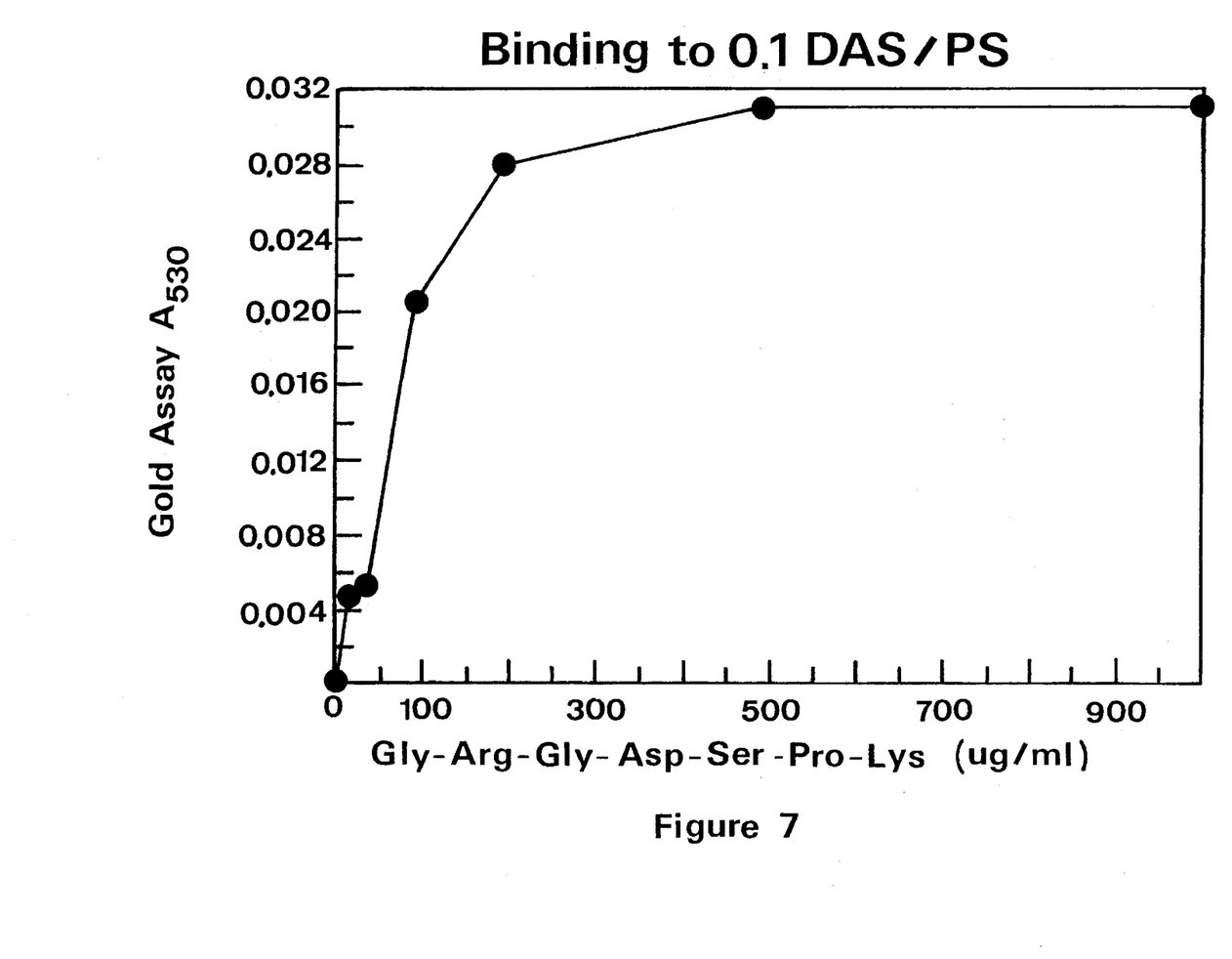
FIG. 7 is a graph of concentration of peptide suspension using the cell adhesion peptide Gly-Arg-Gly-Asp-Ser-Pro-Lys vs. the Gold Assay absorbance at 530 nm of a peptide coated surface. The surface is on a DAS-coated polystyrene substrate produced with a 0.10 mg/ml DAS solution. The Gold Assay procedure is performed after peptide is adsorbed and loosely adsorbed peptide is washed away. The Assay comprises adding colloidal gold solution to the coated surface and allowing the solution to stand for 2 to 4 hours at room temperature. The spent gold solution is then removed, and the plate washed twice with distilled water. The plate is then read at 530 nm in a microplate reader (DYNATECH MR5000).
Figure 8A:
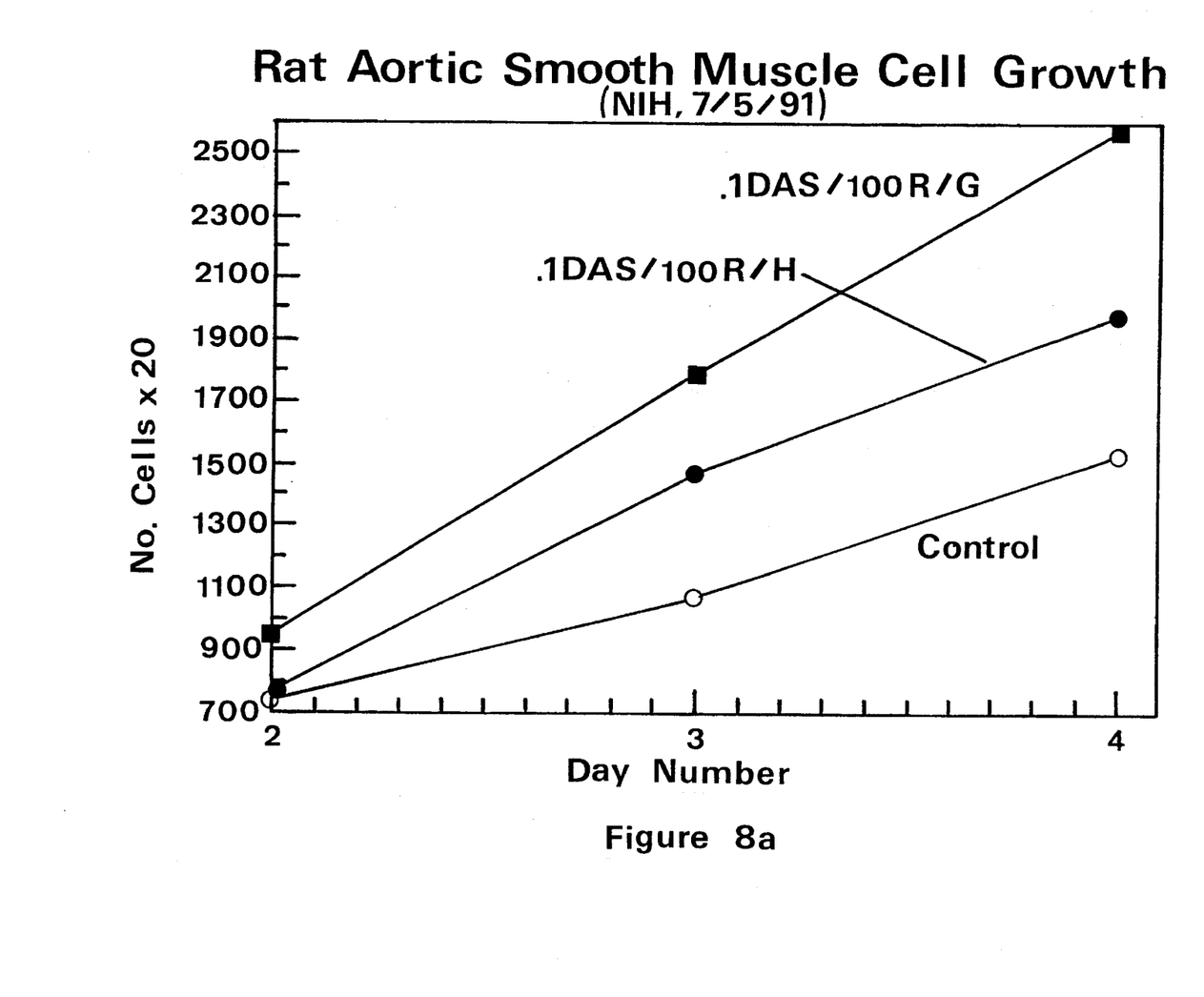
Figure 8B:
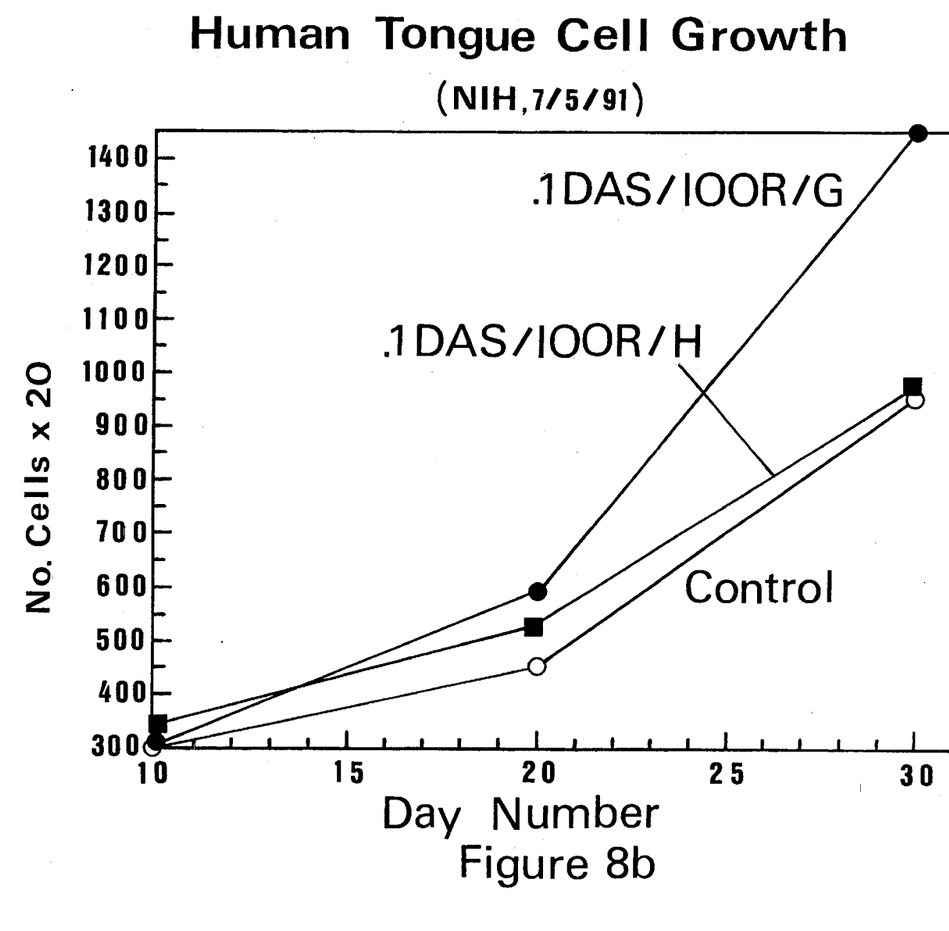
Figure 8C:
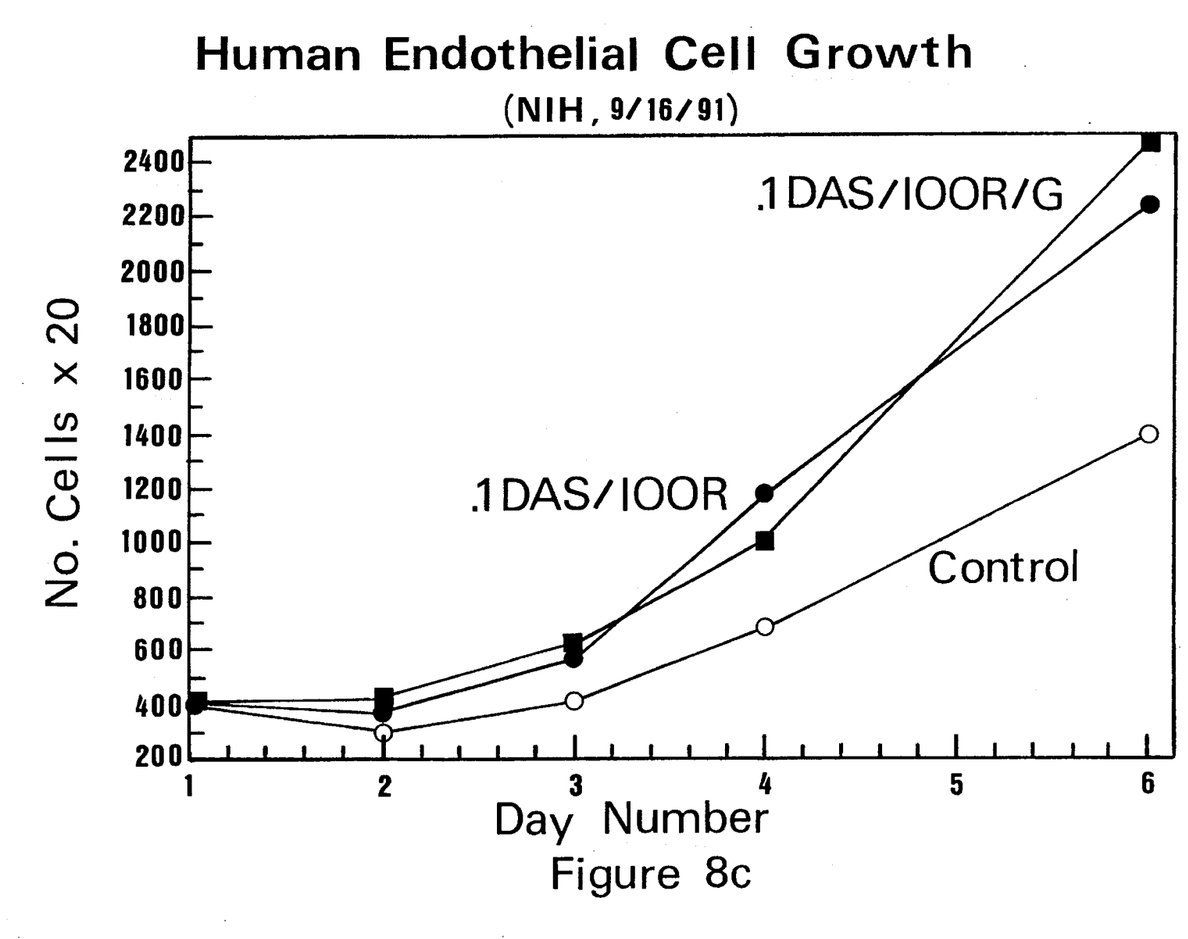

A large number of peptides may be bound to the DAS coated surfaces of the present invention. These include the peptides Gly-Arg-Gly-Asp-Ser-Pro-Lys, Lys-Gly, Gly-Gly-Tyr-Arg, and Arg-Lys-Asp-Val-Tyr. Experiments using polystyrene surfaces showed in general that peptides can be bound to the aldehydic groups on DAS by either the peptide alpha-amine or epsilon-amine of lysyl residues. In both cases, a reducing agent, preferably $NaBH_4$, or $NaCNBH_3$, was required to form a stable carbon to nitrogen bond. Since these experiments, it has been shown that biologically active molecules may be coupled to a DAS-coated surface without a reducing agent. FIG. 7 shows results obtained with the adhesion peptide Gly-Arg-Gly-Asp-Ser-Pro-Lys. The results indicate an increasing amount of peptide that is coupled as the peptide solution concentration is increased until a plateau is reached at the concentration of about 200 ug peptide per milliliter of solution.

Figure 1:
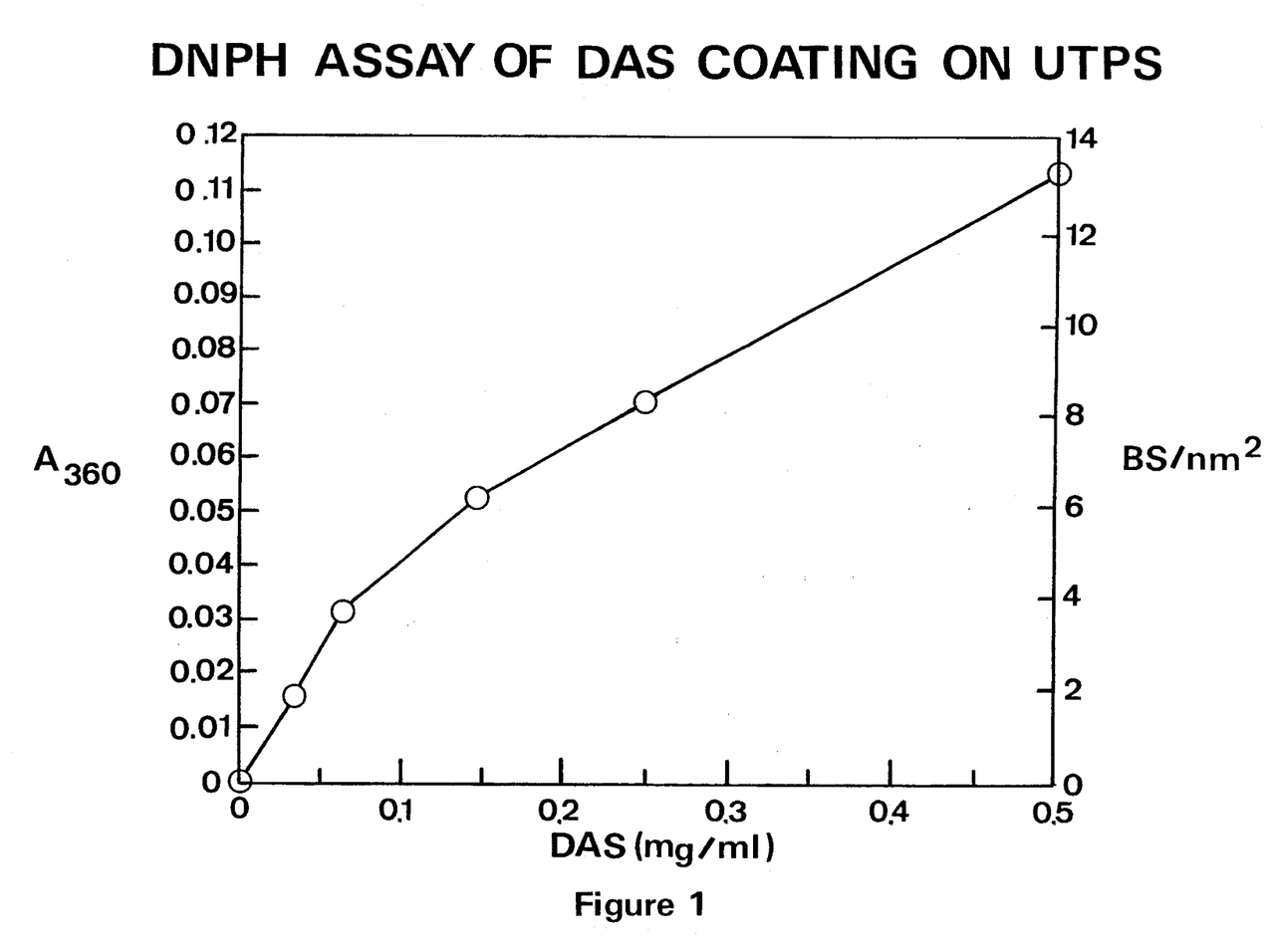
FIG. 1 is a graph of the concentration of DAS solution used to coat an untreated polystyrene (UTPS) surface vs. the absorbance at 360 nanometers (nm) measured using the DNPH assay described herein on the coated surface. The absorbance is also translated into binding sites per nanometer squared ($BS/nm^2$).

An estimate of the mass of peptide can be made using the values obtained with the DNPH assay. FIG. 1 indicates a surface concentration of 3 BS per $nm^2$ at 0.10 mg/ml DAS solution concentration. If it is assumed that the peptide has similar reactivity as DNPH, a surface concentration of 1 microgram (ug) of peptide is calculated per well (96-well).

Figure 11:
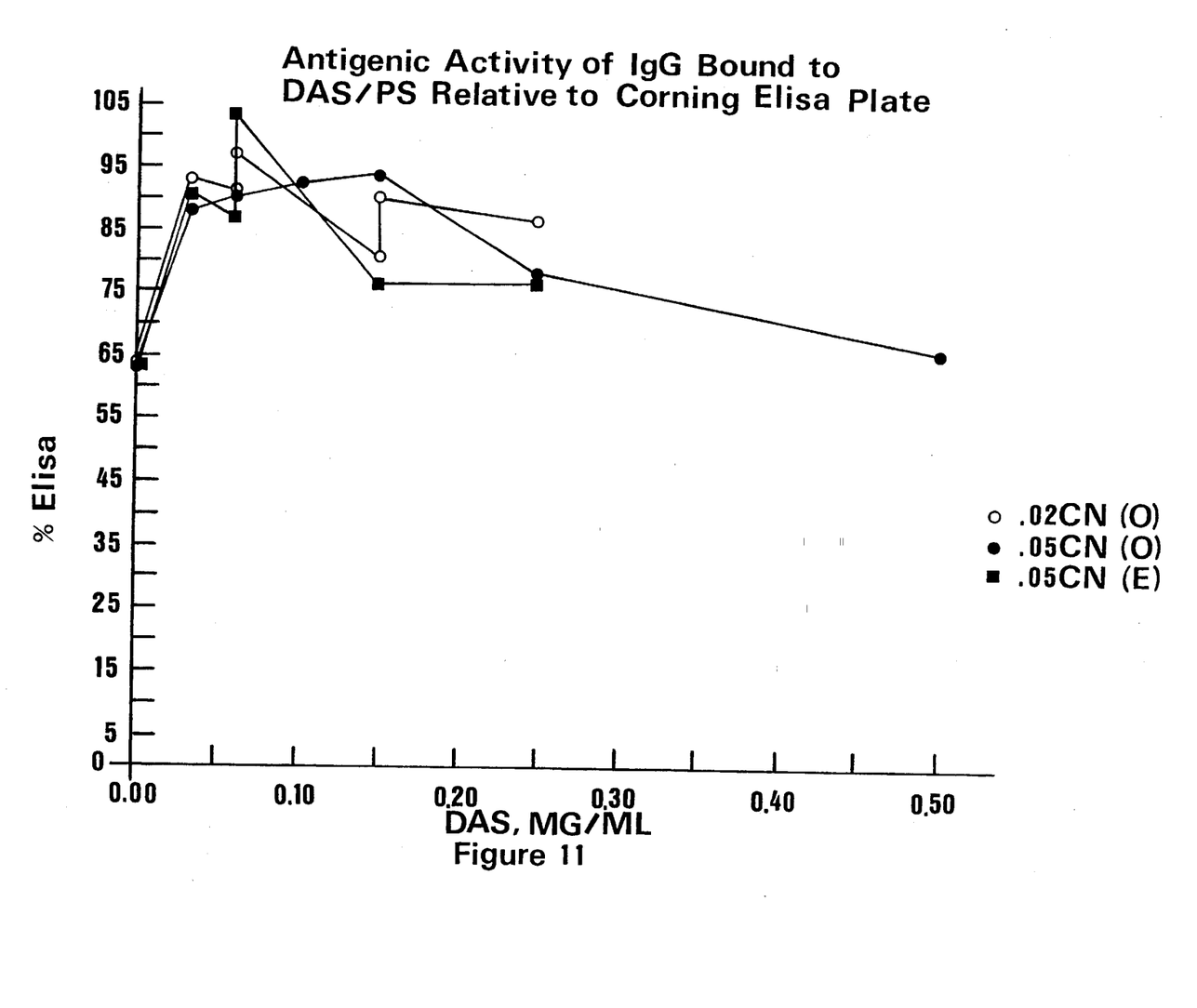
FIG. 11 is a graph of concentration of DAS solution used to coat a polystyrene substrate in mg/ml vs. antigenic activity of Immunoglobulin (IgG) chemically bound to a DAS-coated polystyrene (DAS/PS) substrate expressed as a percentage of the absorbance signal obtained from 1.5 micrograms per milliliter (ug/ml) IgG bound to a standard CORNING ELISA plate. Results are shown for an untreated polystyrene sample bound to IgG using 0.02M NaCNBH$_3$ [0.02CN(O)], for an untreated polystyrene sample bound to IgG using 0.05M NaCNBH$_3$ [0.05CN(O)], and for a polystyrene sample treated with gamma radiation and bound to IgG using 0.05M NaCNBH$_3$ [0.05CN(E)]

While a preferred product of the present invention is an activated surface coupled to cell attachment peptides (cap's), the present invention also encompasses an activated surface coupled to cell attachment proteins (CAP's). Studies were performed that examined the effectiveness of binding of DAS-coated surfaces of the present invention to immunoglobulin (IgG) protein. An application would be a coating for the 96-well plate used as a support for enzyme immunoassays (ELISA). FIG. 11 is a plot of data obtained from the determination of the antigenic activity of IgG chemically bound to DAS-coated polystyrene. Results are shown for an untreated polystyrene sample bound to IgG using 0.02M $NaCNBH_3$ [0.02CN(O)], for an untreated polystyrene sample bound to IgG using 0.05M $NaCNBH_3$ [0.05CN(O)], and for a polystyrene sample treated with gamma radiation and bound to IgG using 0.05M NaCNBHhd 3 [0.05CN(E)]. The results are expressed as a percentage of the signal obtained with IgG physically bound to a standard CORNING ELISA plate. The maximum response of the DAS-coated polystyrene was just about equal to the control surface—a gamma radiation treated polystyrene ELISA surface.

Bovine serum albumin and bovine gelatin (SIGMA G1393—2% gell from bovine skin) have also been successfully bound to DAS-coated polystyrene surfaces of the present invention.

Primary cell studies were undertaken in order to examine whether their response would be similar to the continuous or transformed cell lines. FIGS. 8a–10 display results of growth studies performed at the National Institute of Health laboratories with various primary cell lines grown on the Gly-Arg-Gly-Asp-Ser-Pro-Lys/DAS/polystyrene surface. The results in these cases show that after 3 to 6 days, the surface with bound Gly-Arg-Gly-Asp-Ser-Pro-Lys peptide had nearly two times the growth obtained with the control surface. The control surface was a standard air-plasma or corona treated polystyrene tissue culture surface.

Figure 9:
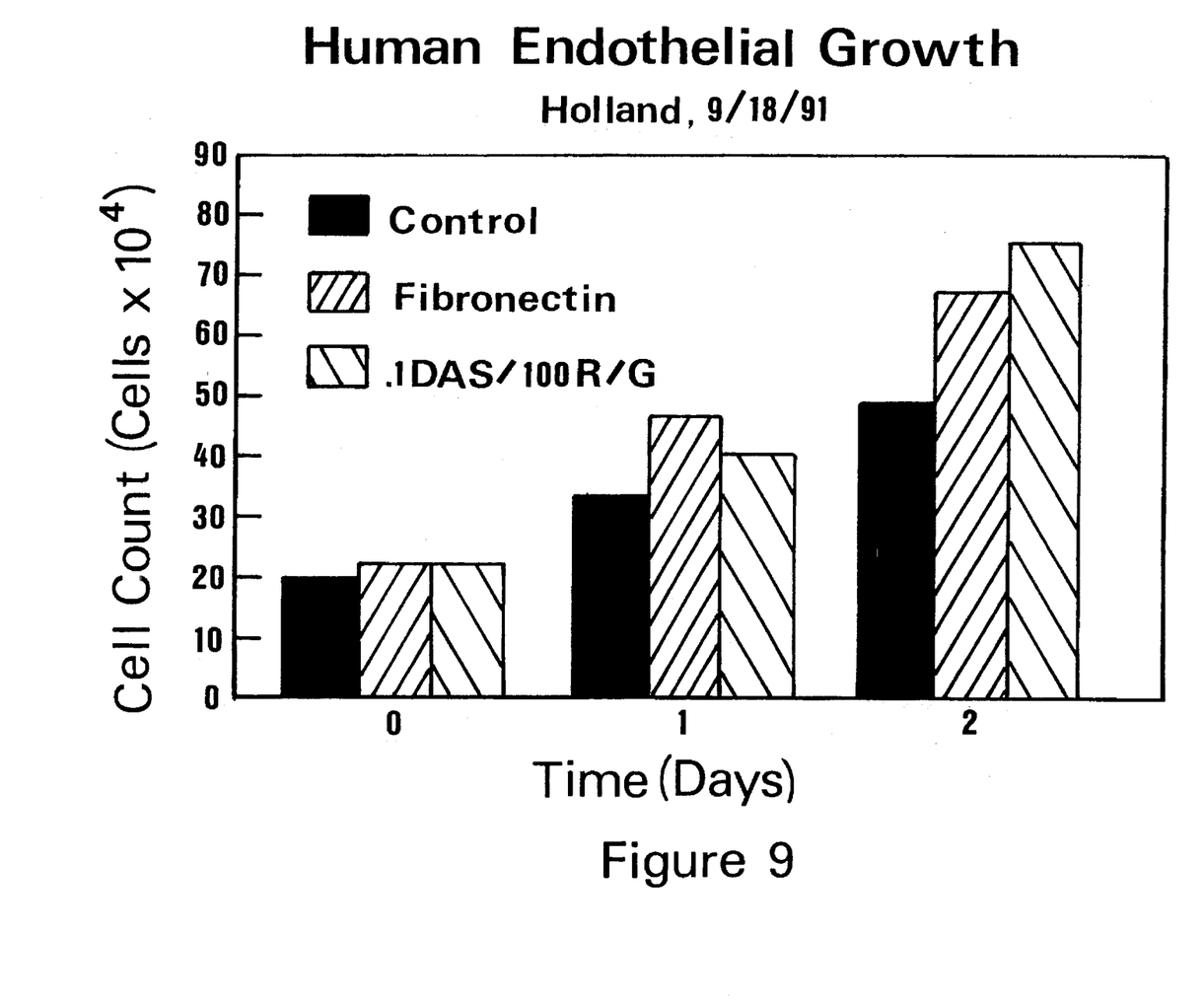
FIG. 9 is a graph of growth time in days vs. human endothelial cells counted on the surface. Results for three surfaces are shown: a standard air-plasma or corona discharge treated polystyrene surface (Control), a standard air-plasma or corona discharge treated polystyrene surface with a fibronectin layer (Fibronectin), and a polystyrene surface coated with DAS using a 0.10 mg/ml solution and treated with a 1 mM Girard's reagent after binding the cell attachment peptide Gly-Arg-Gly-Asp-Ser-Pro-Lys (0.1DAS/100R/G).

FIG. 9 shows some growth studies performed with primary human endothelial cells (HEC). In this case, after 2 days growth, the peptide/DAS surface showed about 50% more cells than the standard air-plasma or corona treated polystyrene tissue culture surface used as control. More importantly, this plot indicates that the peptide-coated surface of the present invention promoted about 15% more cell growth than a standard air-plasma or corona treated polystyrene tissue culture surface having a fibronectin layer—the present state-of-the-art.

Table II lists the performance of various cells grown on a Gly-Arg-Gly-Asp-Ser-Pro-Lys/DAS/polystyrene surface of the present invention as a percentage of growth seen on a control surface—a standard air-plasma or corona treated polystyrene tissue culture surface.

TABLE II

| Cell Type | Performance as % of Control |
|---|---|
| Cell Lines | |
| Human Lung (MRC5) | 93 |
| Canine Kidney (MDCK) | 93 |
| Mouse Neuroblastoma (Neuro-2A) | 87 |
| Monkey Kidney (Vero) | 67 |
| Human ovarian Carcinoma (PA-1) | 68 |

TABLE II-continued

| Cell Type | Performance as % of Control |
| --- | --- |
| Mouse Connective Tissue (L929) Primary cells | 27 |
| Human Umbilical Vein Endothelial | 1800–2500 |
| Rat Aortic | 1700 |
| Human Tongue | 1400 |

These data indicate that the Gly-Arg-Gly-Asp-Ser-Pro-Lys/DAS/polystyrene surface is more useful for primary cell rather than continuous cell line culture in terms of overall growth rate.

Figure 10:
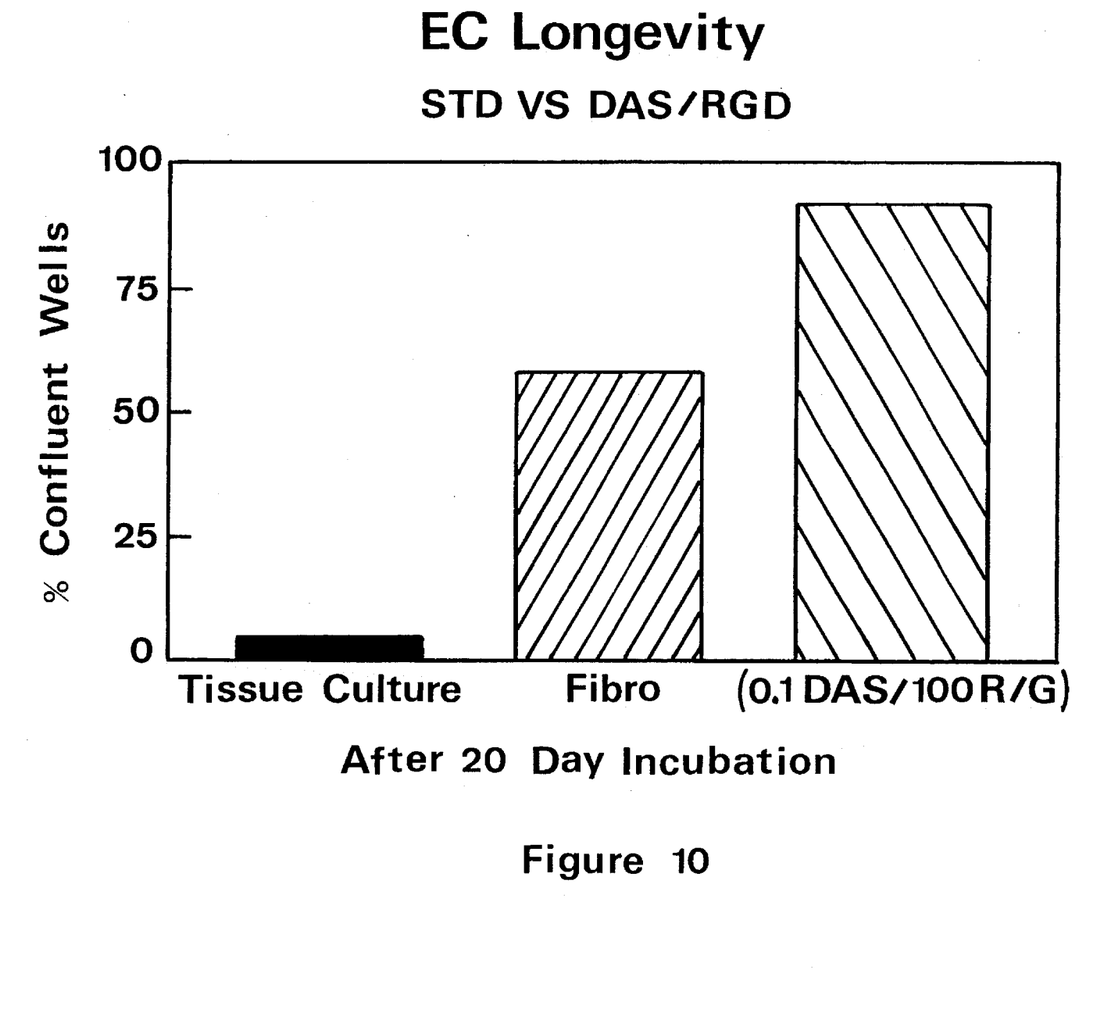
FIG. 10 is a graph of incubation at 20 days vs. the percent of wells in a culture plate showing no visible cell detachment. Results for three surfaces are shown: a standard air-plasma or corona discharge treated polystyrene surface (Control), a standard air-plasma or corona discharge treated polystyrene surface with a fibronectin layer (Fibronectin), and a polystyrene surface coated with DAS using a 0.10 mg/ml solution and treated with a 1 mM Girard's reagent after binding the cell attachment peptide Gly-Arg-Gly-Asp-Ser-Pro-Lys (0.1DAS/100R/G).

A substantial benefit was also obtained with peptide surface in prolonging the viability of a bound confluent monolayer of the human endothelial cells (HEC's) as shown in FIG. 10. There was a 40% increase in the number of wells showing no visible cell detachment after a 20 day incubation in cell growth media when comparing the peptide surface with a fibronectin coated surface.

In addition to the coupling of peptides and proteins, other aminated biomolecules may be coupled to DAS-coated surfaces in order to create possibly bioactive surfaces or surfaces for solid phase immunoassays. Examples of these molecules include, but are not limited to, amino sugars, such as, for example, D-glucosamine, D-galactosamine, or the sialic acids; aminated polysaccharides, such as, for example, chitin, hyaluronic acid and heparin; various conjugated proteins, such as, for example, nucleoproteins, lipoproteins, glycoproteins, mucoproteins, chromoproteins and metalloproteins; aminated antibiotics; and nucleic acids.

EXPERIMENTAL

DAS Dissolution

A paste was made by adding about 0.050 g DAS to about 2 ml of water in a plastic weighing boat. The DAS paste was added to a 1000 ml boiling flask and water was added to a total volume of about 500 ml. The boiling flask was fitted with a reflux condenser and heated for about 53 minutes on a hot plate turned to the high setting. The solution cleared after about 25 minutes of boiling (about 48 minutes total heating time). The flask was then cooled in an ice-bath for about 15 minutes.

DAS Coating and Drying

About 2 ml of an 0.10 mg/ml aqueous solution of DAS was added to each well of a 24 well polystyrene plate. The solution was allowed to stand in the plate for about 15 minutes at room temperature. The solution was then decanted. The polystyrene plate was then placed on an aluminum plate and dried at about 65° C. for about 15 minutes in a forced air oven (Fisher Isotemp).

Chemical Modification of Glass Surfaces

Several 1" by 3" soda-lime glass microscope slides were treated in Plasmod (MARCH INSTRUMENTS) for about 30 seconds at about 1 Torr $O_2$. The slides were then soaked in an aqueous solution of 10% 3-aminopropyltriethoxysilane (PETRARCH SYSTEMS, Inc.—A0750) for about 3 hours at about 70° C. The slides were then rinsed in water and cured for about 18 hours at about 95° C.

DAS Coating of Aminosilane Coated Glass

The walls from wells on several chamber slides (Nunc) were removed and glued onto the silane-coated slides cited above to hold solution. About 2 ml of an 0.10 mg/ml aqueous solution of DAS was placed on each of the silane-coated slides within the wells. The solution was allowed to stand on the slides for about 1 hour at room temperature. The solution was then decanted. The slides were then placed on an aluminum plate and dried at about 65° C. for about 15 minutes in a forced air oven (Fisher Isotemp).

Peptide Coupling to DAS-Coated Surface

A solution of about 100 micrograms per milliliter (ug/ml) of the adhesion peptide Gly-Arg-Gly-Asp-Ser-Pro-Lys (TELIOS, INC.) in 100 mM MOPS, 20 mM $NaCNBH_3$ at about pH 7 was produced. 0.2 ml of the solution was added to each well of a 24 well plate. The plate was placed on a rocking shaker table and allowed to stand for about 18 hours at about 22° C. The solution was then removed by pipette. The wells were then washed with phosphate-buffered saline at pH 7. The plate was then dried at about 30° C. to 35° C. for about 1 hour in a forced air oven (Fisher Isotemp).

The same procedure was performed for the peptides Lys-Gly (SIGMA), Gly-Gly-Tyr-Arg (TELIOS, INC.), and Arg-Lys-Asp-Val-Tyr.

Protein Coupling to DAS-Coated Surface

A solution of 0.10 mg/ml IgG in 100 mM MOPS and 20 mM $NaCNBH_3$ at about pH 7.5 and 100 mM acetate at about pH 4.5 was produced. 2 ml of the solution was added to each well of a 24 well plate. The plate was placed on a rocking shaker table and allowed to stand for about 18 hours at about 22° C. The solution was then removed by pipette. The wells were then washed with phosphate-buffered saline at about pH 7. The plate was then dried at about 30° C. to 35° C. for about 1 hour in a forced air oven (Fisher Isotemp).

The procedure was repeated at different concentrations of IgG. The same procedure was performed for like concentrations of Albumin.

Cell Growth

Plates coated with Gly-Arg-Gly-Asp-Ser-Pro-Lys as described above were sent to Vendor to be sterilized. 500 microliters (ul) of Dulbeco's Modified Eagles Medium supplemented with 242 ug/ml glutamine (DMEM) plus 3% bovine serum albumin (BSA) was added to each well and incubated at room temperature for 30 minutes. Liquid was then removed from all the wells by pipette. 1 ml of DMEM plus 0.02% BSA plus 200 ul human umbilical vein endothelial cell suspension (HUVEC) was added to each well. The wells were then incubated at 37° C. and 5% $CO_2$ for various times. After incubation, the liquid and unattached cells were removed from the wells with pipettes. 2 ml of phosphate buffered saline (PBS) was then added to each well and the wells were shaken gently. The liquid was then removed from the wells. The PBS wash step was then repeated. 1 ml of 0.1% trypsin was then added to each well. After 10 minutes, the released cells were counted in a Coulter counter.

It will be appreciated that a method of attaching DAS to a surface and products produced by that method have been disclosed. Although the present invention has been shown and described with respect to detailed embodiments thereof, it will be understood by those skilled in the art that various changes in the form and detail thereof may be made without departing from the spirit and scope of this invention.

We claim:

1. A substrate for growing cells comprising:
   (a) a base material having a surface;
   (b) a coating on the surface comprising dialdehyde starch; and
   (c) a cell attachment peptide coupled to the dialdehyde starch coating, wherein the base material is selected from the group consisting of polystyrene, polypropylene, polyethylene terephthalate, polyallomer, cellulose acetate, and polymethylpentene.

2. The substrate of claim 1 wherein the cell attachment peptide is selected from the group consisting of Gly-Arg-Gly-Asp-Ser-Pro-Lys, Lys-Gly, Gly-Gly-Tyr-Arg, and Arg-Lys-Asp-Val-Tyr.

* * * * *